US009755500B2

(12) United States Patent
Sadakata et al.

(10) Patent No.: US 9,755,500 B2
(45) Date of Patent: Sep. 5, 2017

(54) POWER FEED DEVICE OF INDUCTIVE CHARGING DEVICE

(71) Applicant: PANASONIC CORPORATION, Osaka (JP)

(72) Inventors: Hideki Sadakata, Shiga (JP); Atsushi Fujita, Shiga (JP); Takashi Kashimoto, Nara (JP); Daisuke Bessyo, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 14/463,381

(22) Filed: Aug. 19, 2014

(65) Prior Publication Data

US 2014/0354073 A1 Dec. 4, 2014

Related U.S. Application Data

(63) Continuation of application No. PCT/JP2013/001537, filed on Mar. 8, 2013.

(30) Foreign Application Priority Data

Mar. 15, 2012 (JP) ................................. 2012-058290

(51) Int. Cl.
 *H02M 1/14* (2006.01)
 *H04B 5/00* (2006.01)
 (Continued)

(52) U.S. Cl.
 CPC ............... *H02M 1/14* (2013.01); *H02J 7/025* (2013.01); *H02J 17/00* (2013.01);
 (Continued)

(58) Field of Classification Search
 CPC .. H02J 7/025; H02J 17/00; H02J 5/005; H02J 50/80; H02J 50/10; H02M 1/14; H04B 5/00
 (Continued)

(56) References Cited

U.S. PATENT DOCUMENTS 6,160,374 A * 12/2000 Hayes ..................... H02J 7/025
 320/108
6,301,128 B1 * 10/2001 Jang ........................ H02J 5/005
 363/127

(Continued)

FOREIGN PATENT DOCUMENTS

EP 2286727 A1 2/2011
JP 2003-274656 A 9/2003
(Continued)

OTHER PUBLICATIONS

International Search Report issued in International Application No. PCT/JP2013/001537 dated May 21, 2013, with English Translation.

(Continued)

*Primary Examiner* — Adi Amrany
(74) *Attorney, Agent, or Firm* — McDermott Will & Emery LLP

(57) ABSTRACT

A power feeding device of a non-contact charging device includes a power factor improvement circuit which converts an AC power supply to DC, and improves a power factor, a smoothing capacitor connected to an output end of the power factor improvement circuit, an inverter circuit which includes a plurality of switching elements, and generates an AC signal using a voltage of the smoothing capacitor as a power supply, a power feeding section which feeds power based on the AC signal to a power receiving device, and a control circuit which modulates at least one of a duty factor or an operation frequency of each of the switching elements (Continued)

of the inverter circuit in synchronization with the AC power supply.

2 Claims, 9 Drawing Sheets

(51) Int. Cl.
*H02J 17/00* (2006.01)
*H02M 1/42* (2007.01)
*H02J 7/02* (2016.01)
*H02M 1/00* (2006.01)

(52) U.S. Cl.
CPC ....... *H02M 1/4208* (2013.01); *H02M 1/4225* (2013.01); *H04B 5/00* (2013.01); *H02M 2001/007* (2013.01); *Y02B 70/126* (2013.01)

(58) Field of Classification Search
USPC ................. 307/104; 363/98, 17; 323/205
See application file for complete search history.

(56) References Cited

U.S. PATENT DOCUMENTS

| | | | | |
|---|---|---|---|---|
| 6,548,985 | B1* | 4/2003 | Hayes | H02J 7/022 |
| | | | | 320/108 |
| 9,001,539 | B2* | 4/2015 | Oh | H02M 1/4241 |
| | | | | 363/125 |
| 9,186,120 | B2* | 11/2015 | Zimpfer | H02J 5/005 |
| 2004/0232876 | A1* | 11/2004 | Matsushiro | H02P 27/045 |
| | | | | 318/801 |
| 2005/0219871 | A1 | 10/2005 | Li et al. | |
| 2007/0052397 | A1* | 3/2007 | Thompson | G05F 1/613 |
| | | | | 323/223 |
| 2008/0253156 | A1 | 10/2008 | Urakabe et al. | |
| 2009/0135629 | A1* | 5/2009 | Mancebo del Castillo Pagola | |
| | | | | H02M 5/42 |
| | | | | 363/34 |
| 2009/0302690 | A1 | 12/2009 | Kubono et al. | |
| 2011/0038190 | A1* | 2/2011 | Zimpfer | A61B 6/56 |
| | | | | 363/126 |
| 2011/0254377 | A1* | 10/2011 | Wildmer | B60L 11/182 |
| | | | | 307/104 |
| 2011/0304216 | A1* | 12/2011 | Baarman | H02J 17/00 |
| | | | | 307/104 |
| 2012/0043930 | A1 | 2/2012 | Scudiere | |
| 2014/0103871 | A1* | 4/2014 | Maikawa | H02J 7/025 |
| | | | | 320/108 |
| 2015/0001958 | A1* | 1/2015 | Abe | H02J 5/005 |
| | | | | 307/104 |
| 2016/0001662 | A1* | 1/2016 | Miller | B60L 11/005 |
| | | | | 307/104 |

FOREIGN PATENT DOCUMENTS

| | | |
|---|---|---|
| JP | 2008-263715 A | 10/2008 |
| JP | 2009-296857 A | 12/2009 |
| JP | 2012-039707 A | 2/2012 |
| WO | 96/32770 A1 | 10/1996 |

OTHER PUBLICATIONS

Extended European Search Report issued in Application No. 13761838.5 dated Apr. 7, 2015.

* cited by examiner

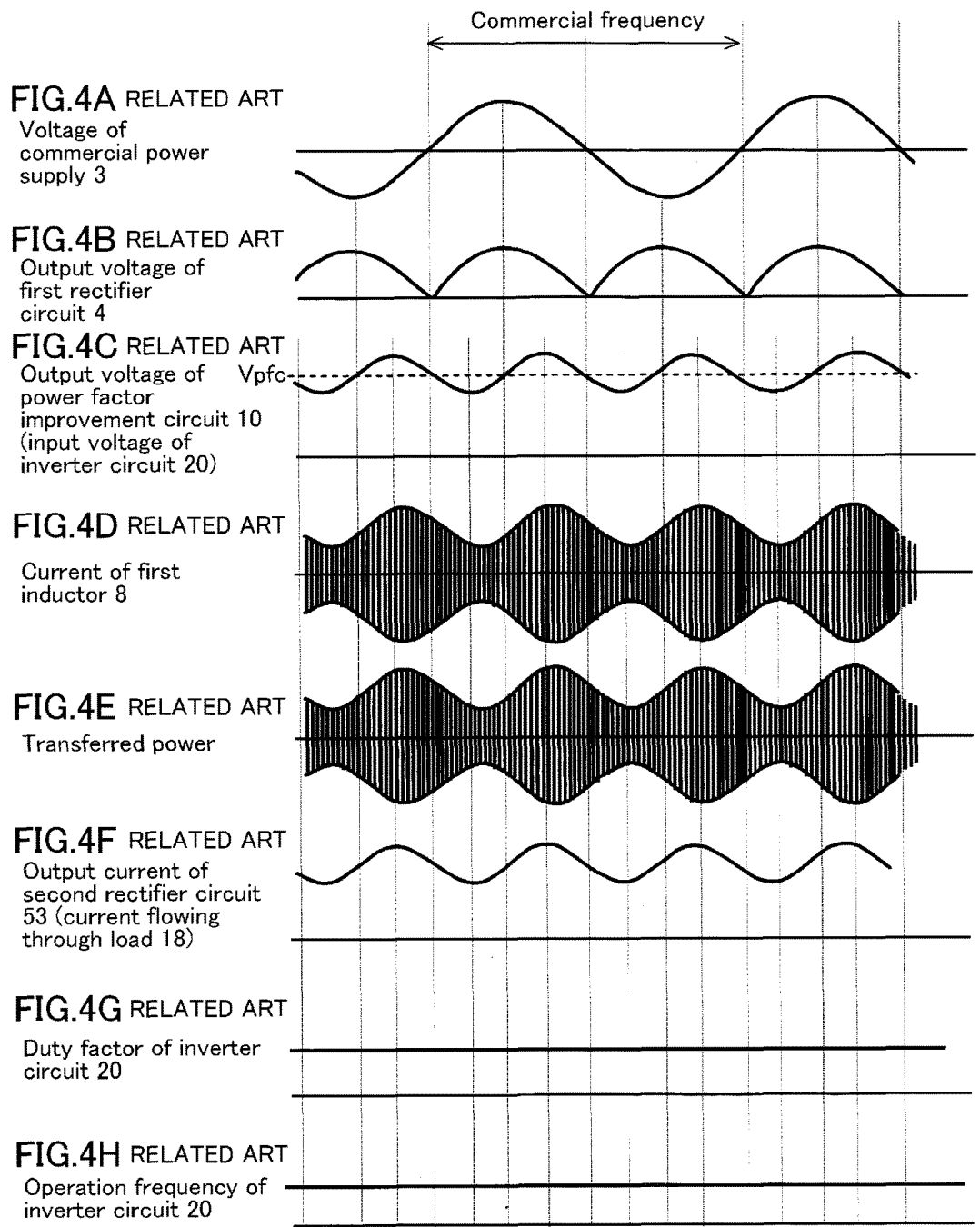

FIG.5A
Voltage of commercial power supply 3

FIG.5B
Output voltage of first rectifier circuit 4

FIG.5C
Output voltage of power factor improvement circuit 10 (input voltage of inverter circuit 20)

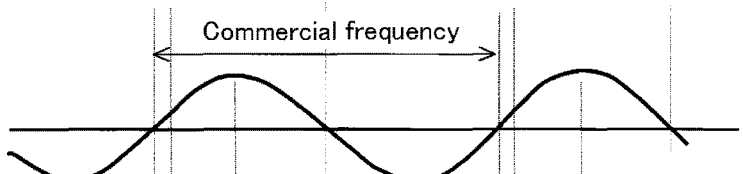

FIG.5D
Current of first inductor 8

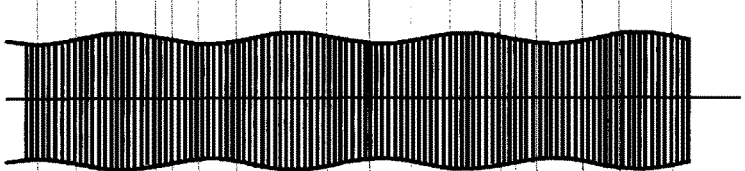

FIG.5E
Transferred power

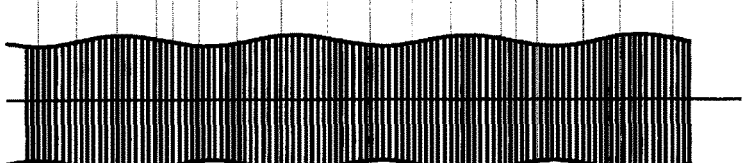

FIG.5F
Output current of second rectifier circuit 53 (current flowing through load 18)

FIG.5G
Duty factor of inverter circuit 20

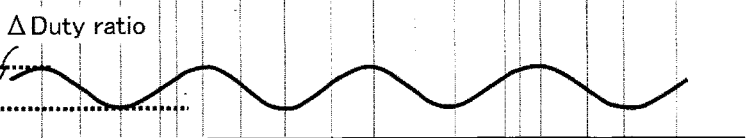

FIG.5H
Operation frequency of inverter circuit 20

FIG.5I
Output signal of synchronizing signal generator 5

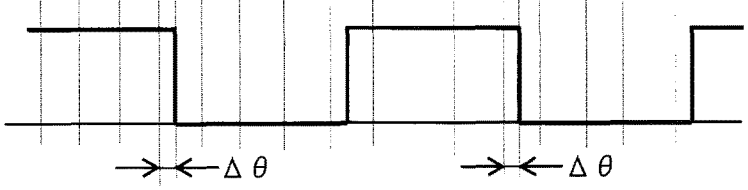

FIG.6A
Current flowing through second switching element 21, second diode 22, fifth switching element 28, and fifth diode 29

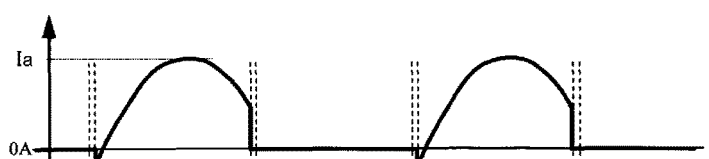

FIG.6B
Current flowing through third switching element 23, third diode 24, fourth switching element 26, and fourth diode 27

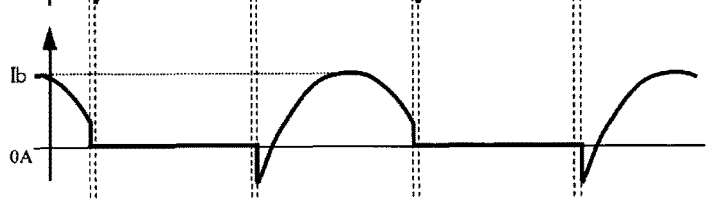

FIG.6C
Voltage of second and fifth switching elements 21 and 28

FIG.6D
Gate voltage of second and fifth switching elements 21 and 28

FIG.6E
Gate voltage of third and fourth switching elements 23 and 26

FIG.6F
Current IL1 flowing through first inductor 8

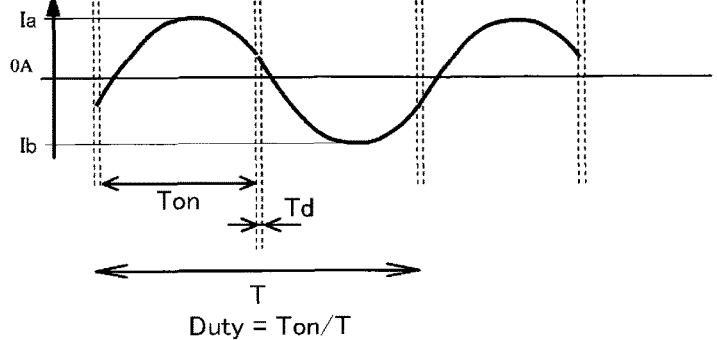

Duty = Ton/T

When input power is high

FIG. 7A
Current flowing through second switching element 21, second diode 22, fifth switching element 28, and fifth diode 29

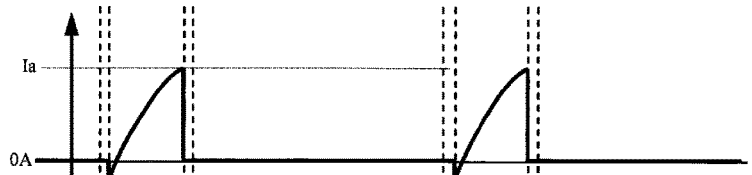

FIG. 7B
Current flowing through third switching element 23, third diode 24, fourth switching element 26, and fourth diode 27

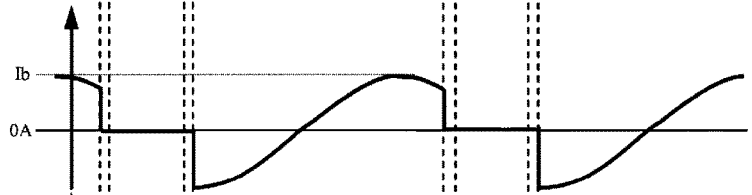

FIG. 7C
Voltage of second and fifth switching elements 21 and 28

FIG. 7D
Gate voltage of second and fifth switching elements 21 and 28

FIG. 7E
Gate voltage of third and fourth switching elements 23 and 26

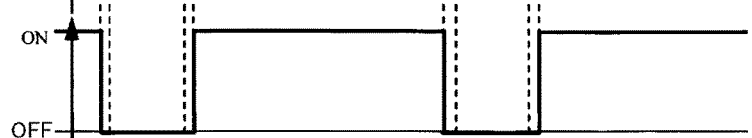

FIG. 7F
Current IL1 flowing through first inductor 8

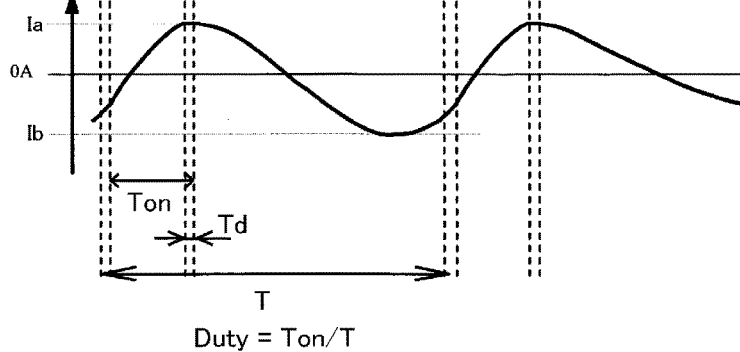

Duty = Ton/T

When input power is low

FIG.8A
Voltage of commercial power supply 3

FIG.8B
Output voltage of first rectifier circuit 4

FIG.8C
Output voltage of power factor improvement circuit 10 (input voltage of inverter circuit 20)

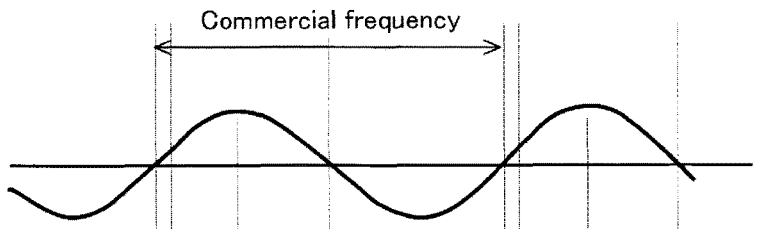
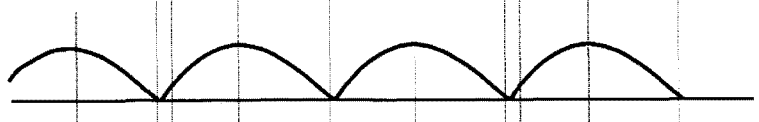

FIG.8D
Current of first inductor 8

FIG.8E
Transferred power

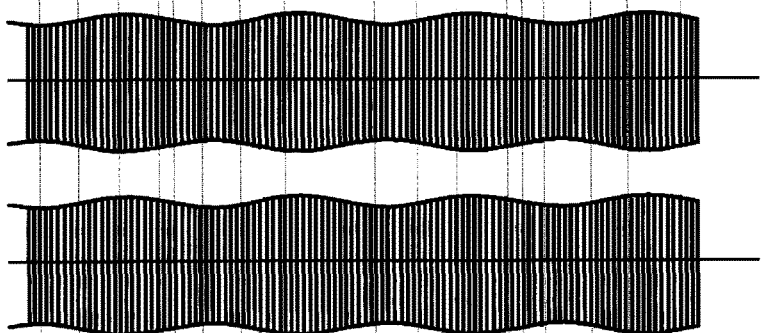

FIG.8F
Output current of second rectifier circuit 53 (current flowing through load 18)

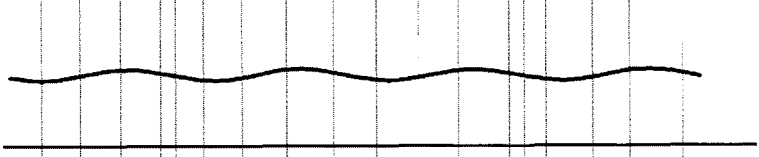

FIG.8G
Duty factor of inverter circuit 20

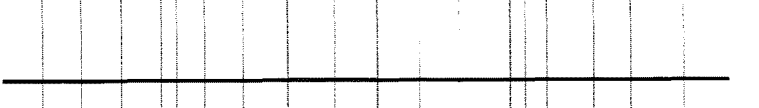

FIG.8H
Operation frequency of inverter circuit 20

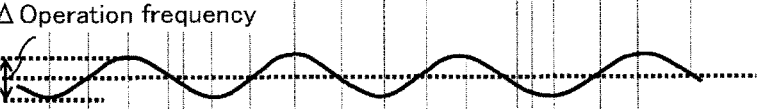

FIG.8I
Output signal of synchronizing signal generator 5

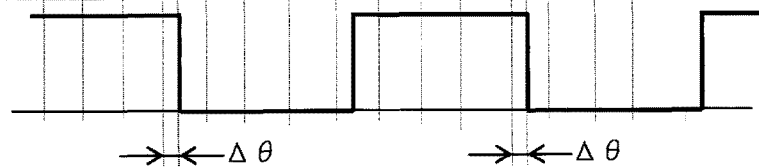

FIG.9A Voltage of commercial power supply 3

FIG.9B Output voltage of first rectifier circuit 4

FIG.9C Output voltage of power factor improvement circuit 10 (input voltage of inverter circuit 20)

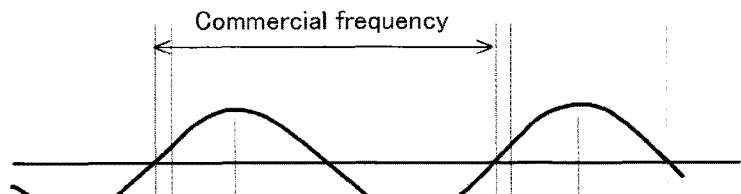

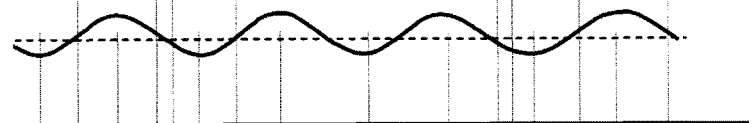

FIG.9D Current of first inductor 8

FIG.9E Transferred power

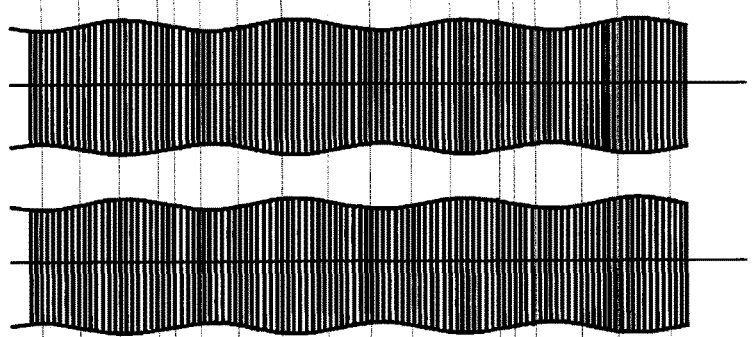

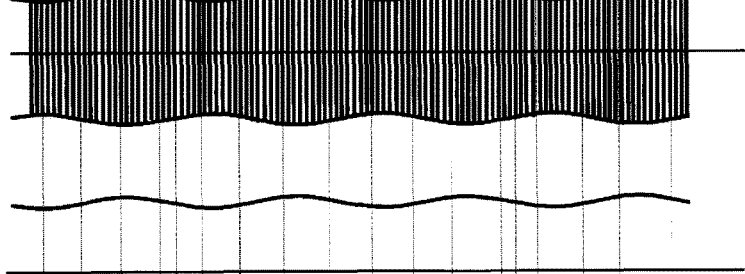

FIG.9F Output current of second rectifier circuit 53 (current flowing through load 18)

FIG.9G Duty factor of inverter circuit 20

FIG.9H Operation frequency of inverter circuit 20

FIG.9I Output signal of synchronizing signal generator 5

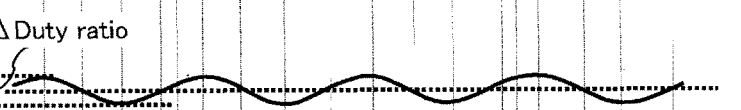

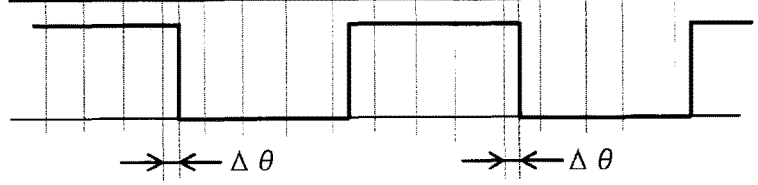

POWER FEED DEVICE OF INDUCTIVE CHARGING DEVICE

CROSS-REFERENCE TO RELATED APPLICATIONS

This is a continuation of International Application No. PCT/JP2013/001537 filed on Mar. 8, 2013, which claims priority to Japanese Patent Application No. 2012-058290 filed on Mar. 15, 2012. The entire disclosures of these applications are incorporated by reference herein.

BACKGROUND

The present disclosure relates to non-contact charging devices for charging secondary batteries mounted, for example, on electric propulsion vehicles (electric vehicles and hybrid electric vehicles) in a non-contact fashion.

Technologies using a magnetic field, an electric field, a radio wave, etc., have been developed to achieve power transfer in a non-contact fashion. The non-contact power transfer technology does not require any wires for connecting a power feeding device and a power receiving device, and users do not have to connect the devices, and do not have to worry about leakage and an electric shock in the event of rain.

In the non-contact power transfer, for example, positional relationship between the power feeding device and the power receiving device is important for enhanced efficiency. In this regard, a technology of providing a resonance part for resonating an AC signal in each of the power feeding device and the power receiving device has been proposed to reduce a constraint of the positional relationship between the power feeding device and the power receiving device (see, e.g., Japanese Unexamined Patent Publication No. 2009-296857).

According to the technology taught by Japanese Unexamined Patent Publication No. 2009-296857, a harmonic content having the same frequency as a frequency of a commercial power supply is superimposed on power output from the power feeding device. As a result, a current or voltage ripple of the harmonic content occurs in the output of the power feeding device, and a ripple occurs also in an output of the power receiving device, i.e., an output current to a battery, etc.

A system of connecting a power supply and an electric propulsion vehicle via wires has been used to charge the electric propulsion vehicle, etc. In the wired system, high-speed feedback control is available when the ripple is detected in the current output to the battery. In the non-contact charging system, however, the high-speed feedback control cannot easily be performed because the power receiving device is wirelessly notified that the ripple is detected in the output current.

As a solution to the above problem, a technology has been proposed that three column circuits (converters) each comprising a serially-connected four stage circuit are connected in parallel to share a plurality of smoothing capacitors, and each of the column circuits is driven by shifting their phases by $2\pi/3$ (rad) (see, e.g., Japanese Unexamined Patent Publication No. 2008-263715). In this technology, the voltage ripple can be reduced by sharing a charge/discharge current to the plurality of smoothing capacitors among the column circuits.

SUMMARY

According to the disclosure of Japanese Unexamined Patent Publication No. 2008-263715, the voltage ripple of the smoothing capacitors can be reduced. However, the multiple column circuits (converters) are required, and parts count of the power feeding device increases. This increases size and cost of the power feeding device, and increases loss of power feed.

In view of the foregoing, the present disclosure is intended to provide a power feeding device of a non-contact charging device which can reduce the ripple in the output, can achieve reduction in size and cost, and can reduce loss of power feed.

To achieve the above-described object, the present disclosure has proposed the following solution. Specifically, the present disclosure provides a power feeding device of a non-contact charging device for feeding power to a power receiving device in a non-contact fashion. The power feeding device includes a power factor improvement circuit which converts an AC power supply to DC, and improves a power factor, a smoothing capacitor connected to an output end of the power factor improvement circuit, an inverter circuit which includes a plurality of switching elements, and generates an AC signal by switching each of the switching elements using a voltage of the smoothing capacitor as a power supply, a power feeding section which includes a resonant capacitor and a first inductor connected to an output end of the inverter circuit, and feeds power generated between the first inductor and a second inductor provided in the power receiving device to the power receiving device based on the AC signal, and a control circuit which modulates at least one of a duty factor or an operation frequency of each of the switching elements of the inverter circuit in synchronization with the AC power supply when the power feeding section feeds the power to the power receiving device.

According to the present disclosure, the power feeding device of the non-contact charging device can reduce the ripple in the output, can achieve reduction in size and cost, and can reduce loss of power feed.

BRIEF DESCRIPTION OF THE DRAWINGS

FIGS. 4A-4H are diagrams of waveforms obtained at sections of a conventional power transfer system for comparison with the non-contact charging device of FIG. 1.

FIGS. 5A-5I are diagrams of waveforms obtained at sections of the non-contact charging device of FIG. 1 when a duty factor of the inverter circuit shown in FIG. 1 is varied.

FIGS. 6A-6F are enlarged diagrams of operating waveforms of the inverter circuit when input power is high.

FIGS. 7A-7F are enlarged diagrams of operating waveforms of the inverter circuit when the input power is low.

FIGS. 8A-8I are diagrams of waveforms obtained at sections of the non-contact charging device of FIG. 1 when an operation frequency of the inverter circuit shown in FIG. 1 is varied.

FIGS. 9A-9I are diagrams of waveforms obtained at sections of the non-contact charging device of FIG. 1 when the duty factor and the operation frequency of the inverter circuit shown in FIG. 1 are varied.

DETAILED DESCRIPTION

The present disclosure is directed to a power feeding device of a non-contact charging device for feeding power to a power receiving device in a non-contact fashion. The power feeding device includes a power factor improvement circuit which converts an AC power supply to DC, and improves a power factor, a smoothing capacitor connected to an output end of the power factor improvement circuit, an inverter circuit which includes a plurality of switching elements, and generates an AC signal by switching each of the switching elements using a voltage of the smoothing capacitor as a power supply, a power feeding section which includes a resonant capacitor and a first inductor connected to an output end of the inverter circuit, and feeds power generated between the first inductor and a second inductor provided in the power receiving device to the power receiving device based on the AC signal, and a control circuit which modulates at least one of a duty factor or an operation frequency of each of the switching elements of the inverter circuit in synchronization with the AC power supply when the power feeding section feeds the power to the power receiving device.

The control circuit increases an amount of modulation of the at least one of the duty factor or the operation frequency of the plurality of switching elements with increase in input from the AC power supply to the power feeding device.

The control circuit modulates the at least one of the duty factor or the operation frequency in a substantially sinusoidal wave pattern at a frequency twice a frequency of the AC power supply.

In this configuration, an output ripple of the power feeding device can be reduced not under feedback control which requires high detection accuracy, but under feedforward control. As a result, the ripple in the output of the power receiving device can be reduced, and the power feeding device no longer requires parts for detecting an output of the first inductor, or parts for detecting a voltage of the smoothing capacitor. Thus, parts count of the power feeding device is reduced, and the power feeding device can be reduced in size and cost.

Embodiments of the present disclosure will be described below with reference to the drawings. The present disclosure is not limited by the embodiments.

First Embodiment

Figure 1:
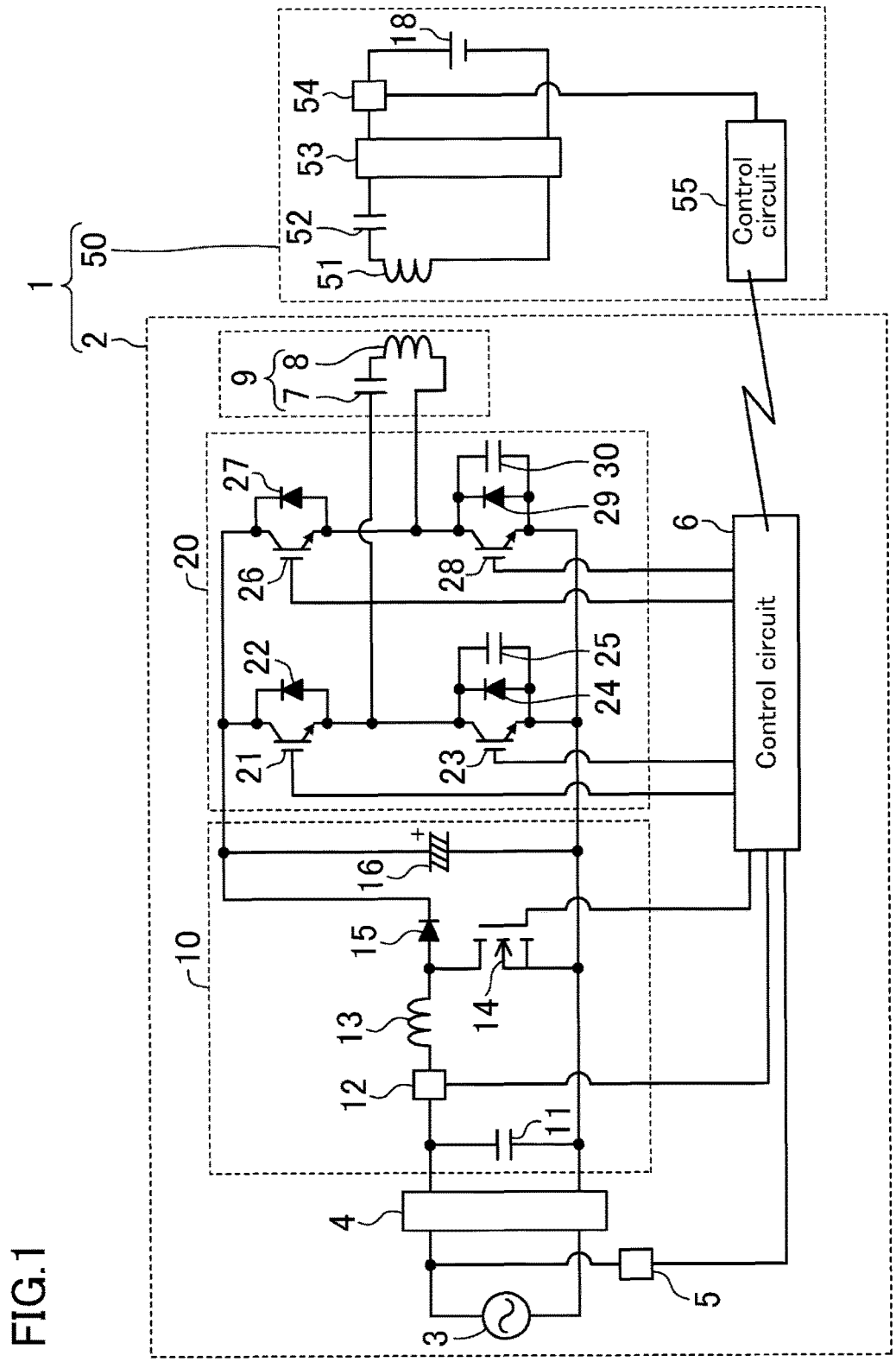
FIG. 1 is a circuit diagram illustrating a non-contact charging device of a first embodiment.

FIG. 1 is a circuit diagram of a non-contact charging device of a first embodiment.

As shown in FIG. 1., a non-contact charging device 1 includes a power feeding device 2 located at a parking lot, for example, and a power receiving device 50 mounted on an electric propulsion vehicle, for example. The power feeding device 2 includes a commercial power supply 3, a first rectifier circuit 4, a synchronizing signal generator 5, a control circuit 6 for the power feeding device 2 (hereinafter merely referred to as a "control circuit 6"), a power feeding section 9, a power factor improvement circuit 10, and an inverter circuit 20.

The power receiving device 50 includes a second inductor 51, a second resonant capacitor 52, a second rectifier circuit 53, a load (e.g., a battery) 18, a power reception detector 54, and a control circuit 55 for the power receiving device 50 (hereinafter merely referred to as a "control circuit 55").

Configurations of these circuit blocks will be described below.

First, a configuration of the power factor improvement circuit 10 will be described. The power factor improvement circuit 10 improves a power factor of the commercial power supply 3. Specifically, the power factor improvement circuit 10 includes a bypass capacitor 11, an input detector 12, a choke coil 13, a first switching element 14 (a MOSFET: metal-oxide-semiconductor field-effect transistor in this embodiment), a first diode 15, and a smoothing capacitor (an electrolytic capacitor) 16.

The commercial power supply 3 is a 200V commercial power supply which is a low-frequency AC power supply, for example, and is connected to an input end of the first rectifier circuit 4 including a bridge diode and an input filter.

A high-side terminal of the bypass capacitor 11 and the input detector 12 are connected to a high-side (positive) output terminal of the first rectifier circuit 4. An output terminal of the input detector 12 is connected to an input terminal of the choke coil 13.

A high-side terminal (drain) of the first switching element 14 is connected to a line connecting an output terminal of the choke coil 13 and an anode of the first diode 15. A low-side terminal of the bypass capacitor 11, a low-side terminal (source) of the first switching element 14, and a low-side terminal of the smoothing capacitor 16 are connected to a low-side (negative) output terminal of the first rectifier circuit 4. A high-side terminal of the smoothing capacitor 16 is connected to a cathode of the first diode 15.

An output voltage of the first rectifier circuit 4 is input as a DC power supply to the power factor improvement circuit 10 constituted as described above. First, the bypass capacitor 11 reduces fluctuations of the output voltage of the first rectifier circuit 4. The output voltage of the first rectifier circuit 4 is then increased to an arbitrary voltage which is a DC voltage higher than a peak value of the output voltage by on-off action of the first switching element 14 and the choke coil 13. The increased voltage is fed to both ends of the smoothing capacitor 16, and is smoothed.

In the present embodiment, the MOSFET which allows high-speed switching is used as the first switching element 14 to operate the power factor improvement circuit 10 at high frequency, thereby enhancing the effect of power factor improvement. In this case, a diode may be connected to the MOSFET in a reverse direction, but the diode is not shown in the figure because fundamental operation of the present embodiment is not affected even if the diode is not connected. An output voltage of the smoothing capacitor 16 is fed to input terminals of the inverter circuit 20.

The input terminals of the inverter circuit 20 are connected to output terminals of the power factor improvement circuit 10, i.e., both ends of the smoothing capacitor 16. To the both ends of the smoothing capacitor 16, serially-connected second and third switching elements 21 and 23, and serially-connected fourth and fifth switching elements 26 and 28 are connected in parallel.

Second and third diodes 22 and 24 are connected in antiparallel to the second and third switching elements 21 and 23, respectively. Specifically, high-side terminals (collectors) of the switching elements and cathodes of the diodes are connected. A snubber capacitor 25 is connected in parallel to the third switching element 23. The snubber capacitor 25 may be connected in parallel to the second switching element 21.

Likewise, fourth and fifth diodes 27 and 29 are connected in antiparallel to fourth and fifth switching elements 26 and 28, respectively. Specifically, high-side terminals (collectors) of the switching elements are connected to cathodes of the diodes. A snubber capacitor 30 is connected in parallel to the fifth switching element 28. The snubber capacitor 30 may be connected in parallel to the fourth switching element 26.

The power feeding section 9 is connected to a line connecting the second switching element 21 and the third switching element 23, and a line connecting the fourth switching element 26 and the fifth switching element 28.

The inverter circuit 20 generates an AC signal by switching the second to fifth switching elements 21, 23, 26, and 28, and outputs the signal to the power feeding section 9.

The power feeding section 9 can be constituted of a first resonant capacitor 7 and a first inductor 8 connected in series.

The second inductor 51 is arranged to face the first inductor 8 when the electric propulsion vehicle has moved, for example. Thus, the power feeding section 9 can feed power generated between the first and second inductors 8 and 51 to the power receiving device 50 based on the AC signal output by the inverter circuit 20.

The second resonant capacitor 52 is connected to a high-side terminal of the second inductor 51. The second rectifier circuit 53 including a smoothing filter is connected between a low-side terminal of the second inductor 51 and the second resonant capacitor 52. The power reception detector 54 is connected to a high-side terminal of the second rectifier circuit 53, and a load, e.g., the battery 18, is connected between the power reception detector 54 and a low-side terminal of the second rectifier circuit 53.

Figure 2:
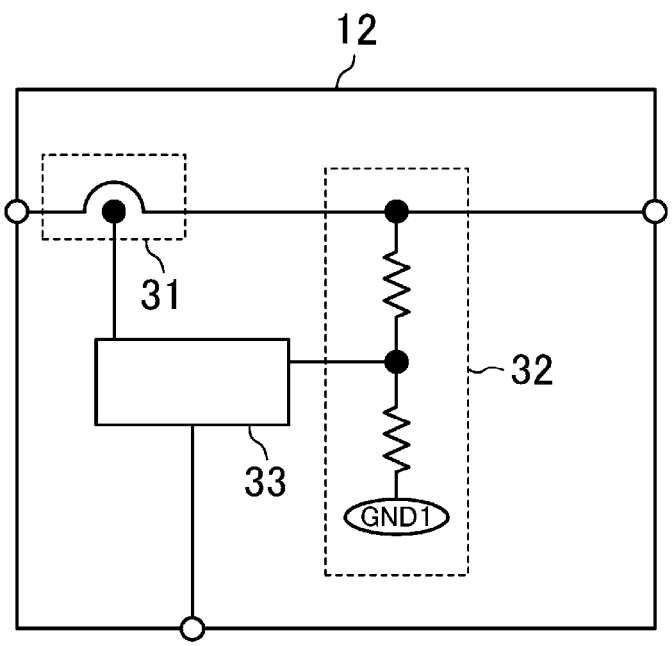
FIG. 2 is a circuit diagram illustrating an example of an input detector shown in FIG. 1.

A specific example of the input detector 12 will be described below with reference to FIG. 2. FIG. 2 is a circuit diagram illustrating an example of the input detector shown in FIG. 1.

As shown in FIG. 2, the input detector 12 is constituted of a current detector 31, a voltage detector 32, and a power operation part 33. The power operation part 33 is connected to the control circuit 6. When the input power can be estimated from one of the current or the voltage, one of the current detector 31 or the voltage detector 32 may be provided.

Figure 3:
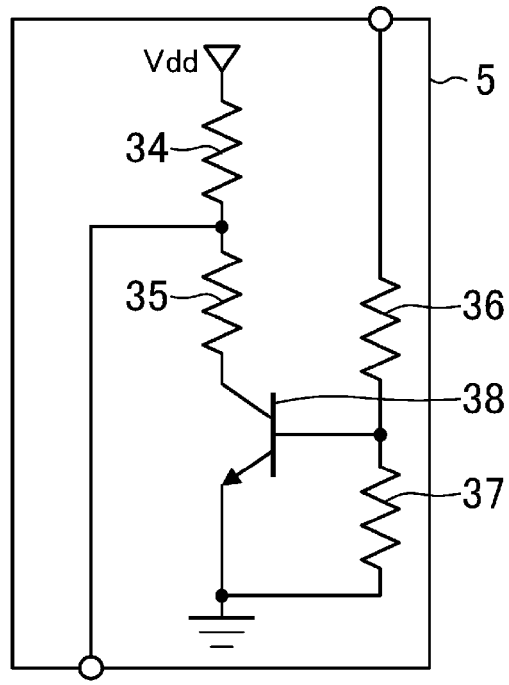
FIG. 3 is a circuit diagram illustrating an example of a synchronizing signal generator shown in FIG. 1.

FIG. 3 is a circuit diagram illustrating an example of the synchronizing signal generator shown in FIG. 1. The synchronizing signal generator 5 is constituted of a plurality of resistance elements 34, 35, 36, and 37, and a transistor 38 as shown in FIG. 3. The synchronizing signal generator 5 generates a signal having a frequency synchronized with a frequency of the commercial power supply 3, and outputs the generated signal to the control circuit 6. In FIG. 3, Vdd indicates a control voltage of the control circuit 6.

Specifically, when the output of the commercial power supply 3 is in a positive half-wave, the transistor 38 is on, and the synchronizing signal generator 5 outputs a synchronizing signal of substantially 0V (=LOW). When the output of the commercial power supply 3 is in a negative half-wave, the transistor 38 is off, and the synchronizing signal generator 5 outputs a synchronizing signal of Vdd (=HIGH) to the control circuit 6.

The control circuit 6 synchronizes with the synchronizing signal to perform modulation on the inverter circuit 20. As described later, the synchronizing signal contains delay time due to on/off action of the transistor 38, and the delay time is Δθ relative to a cycle of the commercial power supply 3.

Although not described in detail, the power reception detector 54 may be configured in the same manner as the input detector 12.

Then, a configuration of the control circuit 6 will be described below. The control circuit 6 wirelessly receives a power command value indicating a power value to be fed to the power receiving device 50 from the control circuit 55. The control circuit 6 compares power based on the input current detected by the input detector 12 and the received power command value, and controls the second and third switching elements 21 and 23 and the fourth and fifth switching elements 26 and 28 of the inverter circuit 20, and the first switching element 14 of the power factor improvement circuit 10 so that power corresponding to the power command value is output. In place of the control circuit 6, an exclusive control IC may be used to control the first switching element 14.

The control circuit 55 determines the power command value based on a remaining voltage of the battery 18 detected by the power reception detector 54, and wirelessly sends the power command value to the control circuit 6. When the power feeding device 2 is operated, the control circuit 55 changes the power command value to be sent to the control circuit 6 based on received power detected by the power reception detector 54 so that overcurrent or overvoltage is not applied to the battery 18.

A battery for electric propulsion vehicles is used as the battery 18 of the present embodiment. In charging the battery, a voltage not lower than the remaining voltage of the battery is fed. However, when the fed voltage exceeds the remaining voltage of the battery, a charging current flows abruptly. This indicates that impedance of a load as seen from the power feeding device greatly varies depending on the remaining voltage of the battery 18 and the fed voltage.

A working mechanism of the non-contact charging device 1 configured as described above will be described below. First, voltage waveforms and current waveforms of sections of a power transfer system of Japanese Unexamined Patent Publication No. 2009-296857 will be described with reference to FIGS. 4A-4H. As a matter of course, the non-contact charging device 1 of the present embodiment and the power transfer system of Japanese Unexamined Patent Publication No. 2009-296857 have different configurations. In FIGS. 4A-4H, items "output voltage of first rectifier circuit 4", "output voltage of power factor improvement circuit 10," etc., are described to compare the non-contact charging device 1 of the present embodiment and the power transfer system of Japanese Unexamined Patent Publication No. 2009-296857, and to indicate the output voltage etc., of the corresponding parts of the power transfer system of Japanese Unexamined Patent Publication No. 2009-296857.

FIG. 4A is a diagram showing a waveform of an AC voltage of the commercial power supply 3, and FIG. 4B is a diagram showing a waveform of an output voltage of a DC power supply, i.e., a waveform of an output voltage of the first rectifier circuit 4. The voltage is input to the power factor improvement circuit 10, increased, and then output to the smoothing capacitor 16.

FIG. 4C is a diagram showing a waveform of a voltage applied to the smoothing capacitor 16, i.e., a waveform of an output voltage of the power factor improvement circuit 10 and a waveform of an input voltage of the inverter circuit 20.

FIG. 4D is a diagram showing a waveform of a high-frequency current generated at the first inductor 8, and FIG. 4E is a diagram showing a waveform of power fed from the power feeding device 2 to the power receiving device 50.

FIG. 4F is a diagram showing a waveform of an output current of the second rectifier circuit 53, i.e., a waveform of an input current of the load 18.

FIGS. 4G and 4H are diagrams showing a duty factor (duty ratio) and an operating frequency of the inverter circuit 20, respectively.

FIGS. 5A-5I show voltage waveforms, current waveforms, etc., of sections of the non-contact charging device of the present embodiment, and FIGS. 5A-5H correspond to FIGS. 4A-4H, respectively. In conventional technologies, the duty factor (duty ratio) and the operation frequency of the inverter circuit 20 are both fixed as shown in FIGS. 4G and 4H.

A working mechanism of the power factor improvement circuit 10 will be described below.

The output of the commercial power supply 3 shown in FIG. 5A is full-wave rectified by the first rectifier circuit 4, and a DC power supply as depicted by the voltage waveform in FIG. 5B is formed. The DC power supply is fed between input terminals of the power factor improvement circuit 10. In the power factor improvement circuit 10, when an instantaneous value of a voltage of the DC power supply is smaller than the voltage of the smoothing capacitor 16, the first diode 15 in the power factor improvement circuit 10 and the bridge diode of the first rectifier circuit 4 are not turned on, an input current waveform is distorted, and the power factor is significantly decreased. At this time, the control circuit 6 turns the first switching element 14 on/off to improve the power factor of the power factor improvement circuit 10.

When the first switching element 14 is on, energy from the commercial power supply 3 is stored in the choke coil 13. Then, when the switching element 14 is turned off, the energy stored in the choke coil 13 is fed to the smoothing capacitor 16 through the first diode 15. Thus, an input current flows from the commercial power supply 3 through the choke coil 13, thereby preventing a distorted input current from flowing from the commercial power supply 3.

In the present embodiment, the power factor improvement circuit 10 has the functions of improving the power factor, and increasing the voltage. Thus, as shown in FIG. 5C, the voltage of the smoothing capacitor 16 has a peak value higher than a peak value of the commercial power supply 3, i.e., a peak value of the input voltage of the power factor improvement circuit 10, which is a peak value of the DC power supply, and the voltage is fed to the inverter circuit 20 through the smoothing capacitor 16. In the voltage of the smoothing capacitor 16, a voltage ripple having a frequency twice the frequency of the commercial power supply 3 relative to a target output voltage Vpfc of the power factor improvement circuit 10 occurs as shown in FIG. 5C.

As indicated by comparison between FIGS. 4A-4C and FIGS. 5A-5C, the power transfer system of Japanese Unexamined Patent Publication No. 2009-296857 and the non-contact charging device 1 of the present embodiment do not have significant difference in waveform of the AC voltage of the commercial power supply 3, waveform of the output voltage of the first rectifier circuit 4, and waveform of the output voltage of the power factor improvement circuit 10.

A working mechanism of the inverter circuit 20 will be described below.

A smoothed DC voltage output to the both ends of the smoothing capacitor 16 connected to output ends of the power factor improvement circuit 10 is fed to the inverter circuit 20 (see FIG. 5C).

In the inverter circuit 20, a high-frequency current of a predetermined frequency is generated in the first resonant capacitor 7 and the first inductor 8 as shown in FIG. 5D by on/off switching of the second and third switching elements 21 and 23, and on/off switching of the fourth and fifth switching elements 26 and 28.

The on/off control of the second and third switching elements 21 and 23, and the on/off control of the fourth and fifth switching elements 26 and 28 are performed by applying an on signal or an off signal to gates of the second to fifth switching elements 21, 23, 26, and 28 from the control circuit 6.

FIGS. 6A-6F are enlarged diagrams of operating waveforms of the inverter circuit when input power is high, and FIGS. 7A-7F are enlarged diagrams of operating waveforms of the inverter circuit when input power is low.

Among FIGS. 6A-6F and FIGS. 7A-7F, FIGS. 6A and 7A show the current flowing through the second and fifth switching elements 21 and 28, and the current flowing through the second and fifth diodes 22 and 29, respectively. FIGS. 6B and 7B show the current flowing through the third and fourth switching elements 23 and 26, and the current flowing through the third and fourth diodes 24 and 27, respectively. FIGS. 6C and 7C show the voltage of the second and fifth switching elements 21 and 28. FIGS. 6D and 7D show a gate voltage of the second and fifth switching elements 21 and 28. FIGS. 6E and 7E show a gate voltage of the third and fourth switching elements 23 and 26.

FIGS. 6F and 7F show a current IL1 flowing through the first inductor 8. In FIGS. 6F and 7F, the current flows through the second and third switching elements 21 and 28, and the second and fifth diodes 22 and 29 in a period Ton in a switching cycle. In the rest of the switching cycle (T-Td-Ton in the figures), the current flows through the third and fourth switching elements 23 and 26, and the third and fourth diodes 24 and 27. In a dead time Td described later, a resonance current of the first inductor 8, the first resonant capacitor 7, and the snubber capacitors 25 and 30 flows.

As shown in FIGS. 6A-6F and 7A-7F, the serially-connected second and third switching elements 21 and 23 are exclusively energized. The fourth and fifth switching elements 26 and 28 are exclusively energized by a driving signal which is phase-shifted from a driving signal of the second and third switching elements 21 and 23.

Specifically, the second switching element 21 and the fifth switching element 28 are on/off controlled in synchronization. When the second switching element 21 and the fifth switching element 28 are on, the third switching element 23 and the fourth switching element 26 are off. When the second switching element 21 and the fifth switching element 28 are off, the third switching element 23 and the fourth switching element 26 are on. Thus, the third switching element 23 and the fourth switching element 26 are on/off controlled in synchronization.

The dead time Td is provided so that the second switching element 21 and the third switching element 23 are not simultaneously turned on, the fourth switching element 26 and the fifth switching element 28 are not simultaneously turned on, and a period in which the second and fourth switching elements 21 and 26 are on does not coincide with a period in which the third and fifth switching elements 23 and 28 are on.

How the second and fifth switching elements 21 and 28 are turned off from an on state will be described below. As the first inductor 8, the first resonant capacitor 7, and the snubber capacitor 25 resonate, the snubber capacitor 25 is slowly discharged. Thus, the second and fifth switching elements 21 and 28 are turned off by zero voltage switching (ZVS). At this time, the snubber capacitor 30 is charged. When the snubber capacitor 25 is fully discharged, the third and fourth diodes 24 and 27 are turned on. While the third and fourth diodes 24 and 27 are on, an on signal is sent to gates of the third and fourth switching elements 23 and 26, and a direction of the resonance current of the first inductor 8 is reversed after a predetermined time, thereby turning the third diode 24 off. Then, the current is commutated to the third and fourth switching elements 23 and 26, and the third and fourth switching elements 23 and 26 are turned on by ZVS and zero current switching (ZCS).

Then, how the third and fourth switching elements 23 and 26 are turned off from the on state will be described below. As the first inductor 8, the first resonant capacitor 7, and the snubber capacitor 30 resonate, the snubber capacitor 30 is slowly discharged. Thus, the third and fourth switching elements 23 and 26 are turned off by ZVS. At this time, the snubber capacitor 25 is charged. When the snubber capacitor 30 is fully discharged, the second and fifth diodes 22 and 29 are turned on. While the second and fifth diodes 22 and 29 are on, an on signal is sent to gates of the second and fifth switching elements 21 and 28, and the direction of the resonance current of the first inductor 8 is reversed after a predetermined time, thereby turning the fifth diode 29 off. Then, the current is commutated to the second and fifth switching elements 21 and 28, and the second and fifth switching elements 21 and 28 are turned on by ZVS and ZCS.

The inverter circuit 20 is operated as described above.

In the present embodiment, for example, a dead time Td of about 2 µs is set so as not to establish a short circuit in the smoothing capacitor 16, and the second and fifth switching elements 21 and 28, and the third and fourth switching elements 23 and 26 are alternately turned on/off.

The drive frequencies (operation frequencies) of the second to fifth switching elements 21, 23, 26, and 28 are kept constant as shown in FIG. 5H, and a duty factor (duty ratio) is controlled as shown in FIG. 5G to control the high-frequency power. The term "duty factor" is defined as a ratio of the period when the second and fifth switching elements 21 and 28 (or the third and fourth switching elements 23 and 26) are on to a period of time required for a single on/off cycle of the second and fifth switching elements 21 and 28 (or the third and fourth switching elements 23 and 26) as shown in FIGS. 6A-6F and 7A-7F.

In a conventional example shown in FIGS. 4A-4H, when the frequency of the commercial power supply 3 is 60 Hz, an input voltage containing a voltage ripple and having a frequency of 120 Hz, which is twice the frequency of the commercial power supply 3, is applied to the inverter circuit 20 as shown in FIG. 4C. Thus, as shown in FIG. 4D, a current ripple occurs in the current of the first inductor 8. Therefore, fed power (transferred power) fluctuates as shown in FIG. 4E, and as a result, a current ripple of 120 Hz occurs in the input current of the load 18 as shown in FIG. 4F. The same is applied to the case where the frequency of the commercial power supply 3 is 50 Hz. In this case, a current ripple of 100 Hz occurs in the input current of the load 18.

In the present embodiment, the duty factor (duty ratio) of the second to fifth switching elements 21, 23, 26, and 28 is modulated by the control circuit 6 in synchronization with the output of the commercial power supply 3 at a Δduty ratio (see FIGS. 5A-5I and FIG. 10) which is an amount of modulation determined based on the input current from the commercial power supply 3 detected by the input detector 12. The modulation in this way can keep the current flowing through the first inductor 8 and the power fed by the power feeding device substantially constant as shown in FIGS. 5D and 5E.

Figure 10:
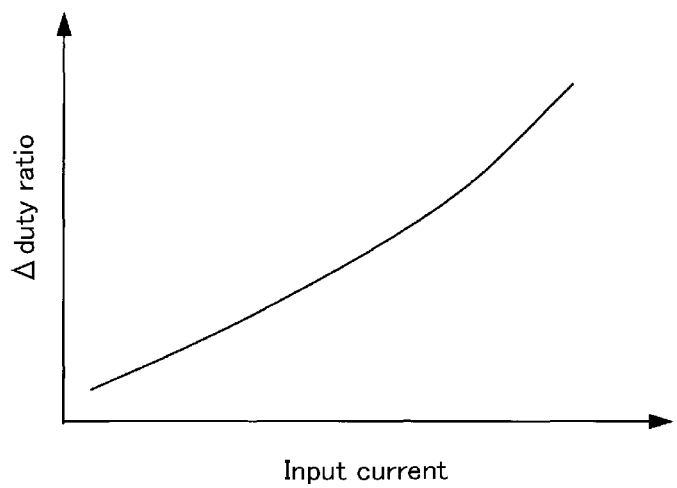
FIG. 10 is a graph showing a relationship between duty ratio and input current of an inverter circuit according to an embodiment.
Figure 11:
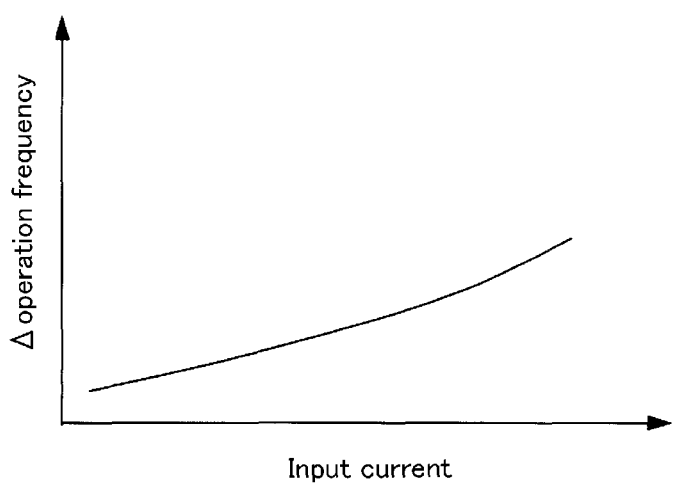
FIG. 11 is a graph showing a relationship between operating frequency and input current of the inverter circuit according to the embodiment.

The voltage ripple of the smoothing capacitor 16 shown in FIG. 5C increases with the increase in input power. Thus, in the present embodiment, the control circuit 6 controls the inverter circuit 20 so that the Δduty ratio increases with the increase in input current as shown in FIG. 10. The control circuit 6 stores information about a relationship between the input current and the Δduty ratio as shown in FIG. 10, and can perform feedforward control based on the input current.

The control circuit 6 modulates the duty factor in synchronization with the output of the commercial power supply 3 based on the signal output by the synchronizing signal generator 5 shown in FIG. 5I. This modulation can cancel the voltage ripple of the smoothing capacitor 16 shown in FIG. 5C which occurs in synchronization with the commercial power supply 3. Thus, the current ripple which occurs in the output of the power receiving device 50 can precisely be reduced.

The output of the synchronizing signal generator 5 contains delay time Δθ shown in FIG. 5I relative to the cycle of the commercial power supply 3, and the control circuit 6 corrects the delay time Δθ to perform the modulation. The delay time Δθ can be fixed irrespective of the input power etc., and the delay time Δθ can easily be corrected by the control circuit 6.

As shown in FIGS. 6A-6F and 7A-7F, the duty factor is set high when the input power is high as compared with the case where the input power is low (for example, the duty factor is 40-50% when the input power is high, and is 20%-30% when the input power is low). As shown in FIG. 5C, when the voltage ripple is present in the output voltage of the power factor improvement circuit 10, the control circuit 6 modulates the second to fifth switching elements 21, 23, 26, and 28 so that the duty factor is set low when the voltage is high, and is set high when the voltage is low (see FIG. 5G). Thus, the current flowing through the first inductor 8 and the power fed to the power receiving device 50 can be kept substantially constant (see FIG. 5E).

When a charging operation starts, the control circuit 55 determines command values of the charging current, the voltage, the power, etc., based on the remaining voltage of the battery detected by the power reception detector 54. Then, the control circuit 55 wirelessly sends the determined command value (e.g., the power command value described above) to the control circuit 6. In the charging operation, the control circuit 55 wirelessly sends information such as the charging current, the voltage, the power, etc., to the control circuit 6. Thus, the control circuit 6 controls the charging current, the voltage, the power, etc., to be fed to the power receiving device 50 based on the received information.

In the power receiving device 50, efficiency of power transfer between the first inductor 8 and the second inductor 51 can be enhanced by resonating the second inductor 51 and the second resonant capacitor 52. Specifically, in an inductance of the second inductor 51, the second resonant capacitor 52 can cancel an impedance component derived from leakage inductance which is not magnetically coupled with the first inductor 8. Thus, impedance of a secondary part (the power receiving device) can be reduced, and as a result, the power transfer can be facilitated. The second resonant capacitor 52 may be omitted.

Upon receiving the power command value from the control circuit 55, the control circuit 6 performs the above-described operation to control the power factor improvement circuit 10 and the inverter circuit 20 so that the power command value corresponds with the detection result of the input detector 12.

In the present embodiment, the control circuit 6 is configured to control the second to fifth switching elements 21, 23, 26, and 28 based on the current value detected by the input detector 12. However, the amount of modulation may be determined based on the input power detected by the input detector 12.

Second Embodiment

A second embodiment, in particular, a difference between the second embodiment and the first embodiment will be described below.

In the first embodiment, the duty factor is modulated with the operation frequencies of the second to fifth switching elements 21, 23, 26, and 28 kept constant to control the high frequency power. In the present embodiment, the operation frequencies of the second to fifth switching elements 21, 23, 26, and 28 are modulated with the duty factor kept constant to control the high frequency power as shown in FIGS. 8A-8I.

In the present embodiment, the fed power increases when the operation frequency of the inverter circuit 20 is lowered (the inverter circuit 20 is operated at a switching frequency which is higher than a switching frequency at which the fed power is maximized). The control circuit 6 modulates the operation frequencies of the second to fifth switching elements 21, 23, 26, and 28 (see FIG. 8H) at a Δoperation frequency (see FIGS. 8A-8I and 11) which is the amount of modulation determined based on the input current from the commercial power supply 3 so that the operation frequencies are set high when the voltage of the smoothing capacitor 16 is high, and are set low when the voltage of the smoothing capacitor 16 is low. This can keep the current flowing through the first inductor 8 and the power fed to the power receiving device 50 substantially constant (see FIGS. 8D and 8E).

Third Embodiment

A third embodiment, in particular, a difference between the third embodiment and the first embodiment will be described below.

In the present embodiment, the control circuit 6 modulates both of the duty factors and the operation frequencies of the second to fifth switching elements 21, 23, 26, and 28 to control the high frequency power as shown in FIGS. 9A-9I.

Specifically, the control circuit 6 modulates the duty factors and the operation frequencies of the second to fifth switching elements 21, 23, 26, and 28 at a Δduty ratio (see FIGS. 9A-9I and 10) and a Δoperation frequency (see FIGS. 9A-9I and 11) which are the amounts of modulation determined based on the input current from the commercial power supply 3 so that the duty factors are set low and the operation frequencies are set high when the output voltage of the power factor improvement circuit 10 (a voltage of the smoothing capacitor 16) is high, and the duty factors are set high and the operation frequencies are set low when the output voltage is low (see FIGS. 9G and 9H). This can reduce the current ripple, and can keep the current flowing through the first inductor 8 substantially constant (see FIG. 9D). As a result, the ripple which occurs in the current flowing through the load 18 can be reduced (see FIG. 9F).

The power feeding device of the non-contact charging device of the present disclosure can reduce superimposition of a current/voltage ripple of a harmonic content derived from a frequency of a commercial power supply on the output of the power feeding device, and can reduce parts count of the power feeding device. Thus, the power feeding device can be reduced in size or cost, and can reduce loss of power feed as much as possible. Therefore, the present disclosure is useful for, for example, power feeding to power receiving devices of electric propulsion vehicles.

What is claimed is:

1. A power feeding device of a non-contact charging device for feeding power to a power receiving device in a non-contact fashion, the power feeding device comprising:
   a power factor improvement circuit which converts an AC power supply to DC, and improves a power factor,
   an input detector which detects input from the AC power supply to the power feeding device,
   a smoothing capacitor connected to an output end of the power factor improvement circuit,
   an inverter circuit which includes a plurality of switching elements, and generates an AC signal by switching each of the switching elements using a voltage of the smoothing capacitor as a power supply,
   a power feeding section which includes a resonant capacitor and a first inductor connected to an output end of the inverter circuit, and feeds power generated between the first inductor and a second inductor provided in the power receiving device to the power receiving device based on the AC signal, and
   a control circuit which modulates a duty factor of each of the switching elements of the inverter circuit in synchronization with the AC power supply at an amount of modulation determined based on the input from the AC power supply to the power feeding device detected by the input detector, when the power feeding section feeds the power to the power receiving device,
   wherein the control circuit increases the amount of modulation of the duty factor of the plurality of switching elements with increase in the input from the AC power supply to the power feeding device detected by the input detector.

2. A power feeding device of a non-contact charging device for feeding power to a power receiving device in a non-contact fashion, the power feeding device comprising:
   a power factor improvement circuit which converts an AC power supply to DC, and improves a power factor,
   an input detector which detects input from the AC power supply to the power feeding device,
   a smoothing capacitor connected to an output end of the power factor improvement circuit,
   an inverter circuit which includes a plurality of switching elements, and generates an AC signal by switching each of the switching elements using a voltage of the smoothing capacitor as a power supply,
   a power feeding section which includes a resonant capacitor and a first inductor connected to an output end of the inverter circuit, and feeds power generated between the first inductor and a second inductor provided in the power receiving device to the power receiving device based on the AC signal, and
   a control circuit which modulates a duty factor of each of the switching elements of the inverter circuit in synchronization with the AC power supply at an amount of modulation determined based on the input from the AC power supply to the power feeding device detected by the input detector, when the power feeding section feeds the power to the power receiving device, wherein the control circuit modulates the duty factor in a substantially sinusoidal wave pattern at a frequency twice a frequency of the AC power supply.

* * * * *